Aug. 24, 1937. E. H. LANGE Re. 20,482
AUTOMOBILE CLUTCH CONTROL SYSTEM
Original Filed Oct. 9, 1929
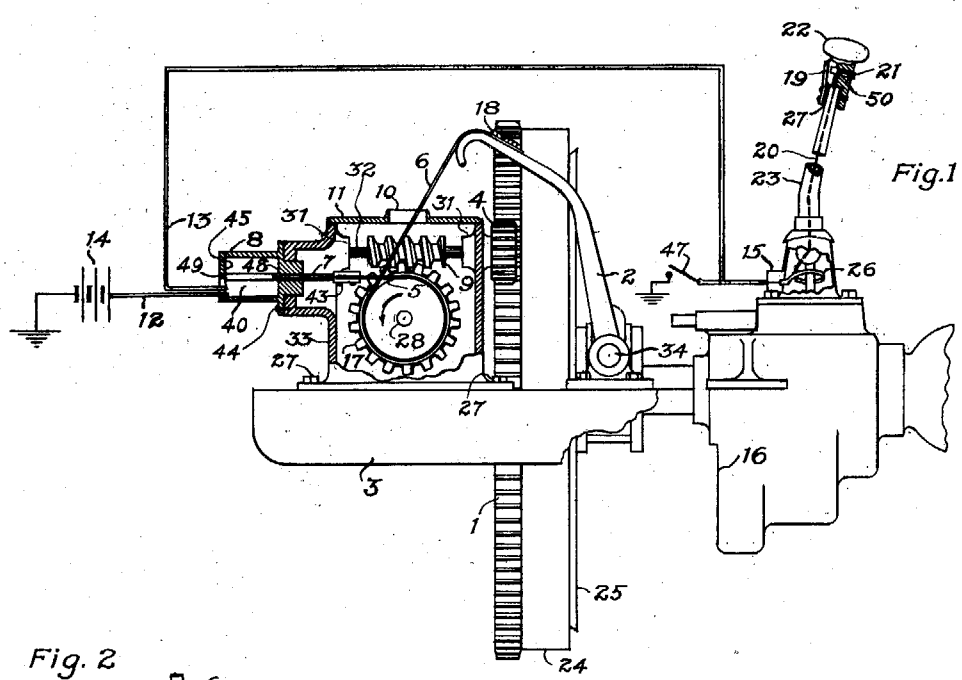
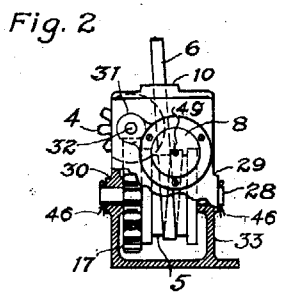
WITNESS.
Myron W. Pullen
INVENTOR.
Edward H. Lange.

Reissued Aug. 24, 1937

Re. 20,482

UNITED STATES PATENT OFFICE 20,482

AUTOMOBILE CLUTCH CONTROL SYSTEM

Edward H. Lange, Baltimore, Md.

Original No. 1,901,371, dated March 14, 1933, Serial No. 398,549, October 9, 1929. Application for reissue March 13, 1935, Serial No. 10,962

17 Claims. (Cl. 192—82)

The principal object of this invention is to provide a device which is simple in structure, reliable in operation, inexpensive to manufacture and readily adaptable to present types of automobiles, which eliminates the unnatural and tiresome posture required in the continuous operation of the clutch pedal, and permits the clutch to be smoothly operated by a small force initiated electrically, thereby giving greater comfort to the operator than is possible with the direct-pressure type of clutch pedal in use at the present time.

As is well known, the direct-pressure clutch pedal in use in the majority of automobiles at the present time, requires considerable foot pressure which is obtained at the expense of comfort, as the location of this pedal in a position permitting the foot to rest either normal to the floor or in an outstretched position would endanger the positive operation of the clutch because sufficient force cannot be brought to bear upon a pedal in either of these positions. This requires a rapid shifting of the operator's foot from a comfortable position to the clutch position. Also, the direct-pressure clutch pedal requires considerable skill in operation in order to prevent sudden engagement of the clutch. This invention, applied in its most comprehensive scope, as herein described and shown in Figures 1 and 2, eliminates the above mentioned disadvantages of the direct-pressure type of clutch pedal.

Another object of this invention is to provide a simple and reliable device whereby the major part of the power required for clutch operation may be obtained from the automobile engine and controlled by the operator, independent of the gear shift or transmission control. A further object of this invention is to provide a compact tension amplifying unit readily adaptable to automobile equipment in common use at the present time, by means of which a small applied force may be mechanically increased to a magnitude sufficient to operate the automobile clutch.

In the accompanying drawing, Figure 1 shows in diagram form the mechanical amplifier unit with electrical control, and Figure 2 is another view of the mechanical amplifier unit.

Referring to Figure 1, the engine flywheel 24, transmission 16, clutch 25, clutch pedal shaft 34, engine support 3 and flywheel gear 1, are shown for the purpose of illustrating the application of this invention. The mechanical amplifier unit is shown at 33, secured to the engine support 3 by means of the bolts 27 and arranged so as to take power from the flywheel gear 1 by meshing with pinion 4. The pinion 4 drives the shaft 32 and worm wheel 9, which in turn drives the gear wheel 17 and flanged drum 5. The gear wheel 17 and flanged drum 5 rotate together about the shaft 28. By means of the pinion 4, worm 9 and gear wheel 17, the angular velocity of the flanged drum 5 is reduced in relation to the angular velocity of the flywheel 24, and the direction of rotation of the flanged drum 5 suitably oriented for operation of the friction belt 6 and clutch lever 2. The clutch lever 2 replaces the usual clutch pedal of the direct-pressure method of operation in which the clutch is actuated by foot pressure. The friction belt 6 is secured to the lever 2 by means of the bolts 18, and after one or more convolutions about the drum 5 in the direction shown terminates at the plunger 7 to which it is secured by means of the screws 43. The solenoid 8 is arranged as shown, and fastened to the case 33 by means of the screws 44. The space 40 contains a winding which terminates in the wires 12 and 13. The cover plate 11 for the amplifier unit contains the slot 10 which permits the belt 6 to pass through and operate the lever 2 in its various positions. The structural features described can also be seen by reference to Figure 2. The case 33 of the amplifier unit contains the bearings 31 for the worm shaft 32, also the bearings 29 and 30 for the drum shaft 28. The gear 17 and flanged drum 5 are preferably of one piece, and rotate together about the shaft 28 which is secured by the cotter pins 46. The cover plate 11 is fastened to the main case 33 preferably by screws in the top, so that it can be readily removed and the interior of the unit made accessible. The solenoid 8 is energized by means of the battery 14 and the circuit initiated by the switch 19 or 47.

In Figure 1 the clutch lever is shown in the normal or running position in which the clutch is engaged and driving through the transmission. In this condition, the slow speed flanged drum 5 slides around in the friction belt 6, and the plunger 7 is free to accommodate the belt 6 to a position of minimum tension. When it is desired to operate the clutch, the switch 19 or 47 is depressed, and the solenoid 8 is energized, thereby applying a continuously increasing force upon the plunger 7, which slides through the bearing 48 and approaches the limiting position shown at 45. The magnetic force applied at the plunger 7 is considerably amplified at the extremity of the belt which is bolted at 18 to the clutch lever, and the clutch lever is pulled down by the belt 6. The ratio of the force at the high-tension end of the belt, that is at 18, to the force at the low-tension end of the belt, that is at 7, is approximately constant, in accordance with well known principles of belt friction, and the magnitude of this ratio depends upon the coefficient of friction of the belt upon the flanged drum and the total angle of contact of the belt upon the flanged drum. An important feature of this invention is the above described means whereby the continuously increasing torque of the clutch lever as it is deflected is met by the amplified continuously increasing solenoid pull, and whereby the maximum deflection of the clutch lever is limited by the travel of the plunger. Another important feature of this invention is the retarding torque produced on the clutch lever when the solenoid is deenergized. The solenoid 8 is of the iron-clad type, and the end plate 45 which is preferably screwed to 8, contains a hole 49, which serves to cushion the plunger 7. As the plunger is withdrawn from the solenoid, the clutch lever experiences a retarding torque due to the friction of the belt 6 on the flanged drum 5, and the gradual admission of air through the hole 49 to the plunger, thus permitting a gradual engagement of the clutch. A further feature of the device is the direct connection of the belt 6 to the lever 2, by means of which the mutual geometrical relation of the input shaft 28, output shaft 34, the clutch lever 2 and belt 6 provides a varying surface of contact of the belt upon the flanged drum as the plunger is displaced, thereby providing a useful means of adjusting the output torque on the shaft 34 in relation to the input torque on the shaft 28, the input torque for any displacement of the plunger being determined by the force-characteristic of the solenoid.

The wire 12 of the solenoid is connected to the battery 14, one terminal of which is grounded or connected to the metallic engine support so as to provide a return circuit of high electrical conductance for the terminal wire 13, which is grounded by the switches 19 or 47, when it is desired to operate the solenoid 8 and clutch lever 2. One or more switches such as 47, connected to the terminal wire 13, may be located in any desired position for the purpose of operating the clutch lever, however, this invention purposes placing a switch 19 on the gear shift lever 23 and immediately below the gear shift lever knob 22, in the manner shown in Figure 1. The location of the clutch operating switch 19 in the position shown, enables the operator to depress the clutch lever 2 and move the gear shift lever 23 with one operation of the hand, as the knob 22 is grasped in the usual manner with the fingers free to depress the switch lever 19.

While it is not the purpose of the present invention to provide a specific form of switching apparatus for actuating the solenoid 8, because of the importance of the location of the clutch operating switch 19, the electrical connections of this switch are shown in Figure 1. The wire 13 leading from the solenoid is brought to the insulated terminal block 15, within which it connects to the insulated spiral spring 26, which permits the normal lateral motion of the gear shift lever without disturbing the continuity of the electric circuit to the switch 19. The electrical connection from the spiral spring to the switch contact terminal 21 is made by means of the insulated conductor 20 which passes through the hollow gear shift lever 23. The switch lever 19 connects electrically with the metallic bushing 27, which in turn is electrically connected with the lever 23. The knob 22 and switch base 50 are of the same piece of molded electrical insulating material.

The additional switch 47 is in parallel with the switch 19, and is located preferably on the floor of the automobile, so that it can be operated when the foot is resting in a comfortable outstretched position upon the floor, and without the considerable flexure of the leg and elevation of the foot above the floor that is necessary in operating the direct-pressure clutch pedal in common use at the present time. Manifestly, this is accomplished by a large variety of switches, any one of which, such as 19, requires but a small motion of the spring lever 19 to initiate the electric circuit which operates the solenoid.

It will be noted that after deenergizing the solenoid 8 and releasing the holding force upon the plunger 7 by opening the switch 19 for example, the return of the lever 2 is retarded, and the engagement of the clutch restrained by the application of engine-power to the member 6 during the period of clutch engagement. The motion of the plunger in relation to the solenoid as the plunger is withdrawn by the lever 2, is opposed by the restricted flow of air through the hole 49, and a restraining force is established at the low-tension end of belt to which the plunger 7 is connected. The rate of release of the clutch lever 2 is continuously regulated by the application of engine-power from the drum 5 to the high-tension end of the belt 6, by the forces acting on the plunger 7 connected at the low-tension end of the belt.

While I have shown and described a preferred embodiment of my invention, it will be evident that many other modifications and changes may be made in the specific embodiment of my invention and within the spirit of the appended claims.

What is claimed is:

1. In an automobile having a source of mechanical power, a manually operated transmission gear shift lever, a source of electrical power, and a clutch lever, a clutch lever operating apparatus which comprises a rotating drum operated by means of the source of mechanical power, a speed proportioning mechanism interrelating the speed of the drum and of the source of mechanical power, an electric switch located upon the transmission gear shift lever, an electromagnetic solenoid actuated by the source of electrical power and from the electric switch, and a frictional belt variably coupled with the drum, having one end connected to the plunger of the electromagnetic solenoid and the other to the clutch lever.

2. The apparatus for operating the clutch of an automobile having a mechanical power source, an electrical power source, and a manually operated transmission control lever, which apparatus comprises a rotating drum driven by the mechanical power source, an electromagnetic solenoid with plunger, a flexible belt variably and frictionally coupled with the drum, having one end connected to the plunger of the electromagnetic solenoid and the other end to the clutch operating lever, and an electric switch mounted upon the transmission control lever, whereby the hand employed in operating the transmission control lever suffices without change of position to also initiate an electric circuit by means of the electric switch, energize the electromagnetic solenoid from the electrical power source, couple the belt with the drum, and disengage the clutch; and whereby the release of the electric switch causes a gradual return of the clutch lever to its normal position.

3. The combination in an automobile of a mechanical power source, an electric power source, an independent clutch operating lever, and a torque amplifying apparatus which contains a worm wheel attached to a shaft, a gear wheel attached to a drum, an electromagnetic solenoid with plunger, and a flexible belt wrapped around the drum having one end connected to the plunger and the other to the clutch operating lever, said shaft being rotated by the mechanical power source and said gear wheel rotated by the worm wheel, whereby closure of the electric switch actuates the plunger, impresses upon the drum a small torque insufficient for clutch operation, frictionally couples the flexible belt with said drum, and impresses upon the clutch operating lever a proportionally increased torque sufficient to operate the clutch.

4. The apparatus for operating the clutch in a mechanical power transmission system having a driving shaft, a driven shaft, an intermediate clutch and clutch operating lever, and subsidiary electric power supply, which apparatus comprises a rotating drum driven by the driving shaft, an electromagnetic solenoid and plunger, a frictional belt variably coupled with the drum, having one end connected to the plunger and the other to the clutch operating lever, and an electric switch by means of which the solenoid is energized from the subsidiary electric power supply, the friction of the belt upon the drum increased, and the clutch operating lever displaced.

5. The apparatus for operating the clutch of an automobile having an engine with flywheel, a storage battery, a manually operated transmission gear shift lever and a clutch operating lever, which apparatus consists of a drum with attached gear wheel rotated by a worm wheel which is geared to the engine flywheel, an electromagnetic solenoid and plunger, a flexible frictional belt wrapped around the drum having one end attached to the plunger and the other to the clutch operating lever, and an electric switch mounted upon the transmission gear shift lever, whereby the hand used in operating the transmission gear shift lever suffices to initiate an electric circuit from the storage battery to the electromagnetic solenoid, couple the flexible frictional belt with the drum, and operate the clutch operating lever.

6. The apparatus for operating the clutch of an automobile having an engine with a flywheel, a storage battery, a manually operated transmission gear shift lever, and a clutch operating lever, which apparatus consists of a drum with attached gear wheel rotated by means of a worm wheel which is geared to the engine flywheel, an electromagnetic solenoid and plunger, a flexible frictional belt wrapped around the drum having one end attached to the plunger and the other to the clutch operating lever, and a foot-operated electric switch which initiates an electric circuit from the storage battery to the electromagnetic solenoid, thereby coupling the flexible frictional belt with the drum and operating the clutch operating lever.

7. The apparatus for producing a useful output torque from a small and insufficient input torque for the purpose of clutch operation, in an automobile having a storage battery with insufficient power supply for continuous clutch operation, and an engine with ample power supply for continuous clutch operation, said apparatus consisting of a drum with attached gear wheel rotated by a worm wheel driven by the engine, an electromagnetic solenoid and plunger, a flexible belt wrapped around the drum having one end attached to the plunger and the other to the clutch operating lever, and an electric switch arranged to be operated by foot, whereby the operation of said switch initiates a circuit from the storage battery, actuates the plunger, couples the drum and flexible belt and operates the clutch operating lever, and whereby the release of said switch causes the clutch operating lever to gradually return to its normal position.

8. In an automobile having an engine, a manually operated gear shift lever, an independent clutch operating lever, and a storage battery, the apparatus for producing a useful output torque from a small and insufficient input torque for the purpose of operating the clutch, said apparatus comprising a drum rotated by power from the engine, a solenoid and plunger controlled by an electric switch which is operable from the manually operated gear shift lever, and a flexible belt frictionally coupled with the drum having one end connected to the plunger and the other to the clutch operating lever, whereby operation of the electric switch energizes the solenoid from the storage battery produces a small torque upon the drum and superposes a greater operating torque upon the clutch operating lever.

9. In an automobile having an engine, a clutch and clutch operating lever, and a storage battery, a clutch-control system comprising a drum rotated by the engine at greatly reduced speed relative to the engine speed, an electric switch arranged to be operated by foot, an electromagnetic solenoid and plunger, restricted air-flow means for retarding the motion of said plunger, and a flexible frictional belt wrapped around the drum having one end connected to the clutch operating lever and the other end connected to the plunger, whereby closure of said switch energizes the solenoid from the storage battery, couples the belt with the drum and disengages the clutch, and whereby release of said switch causes a gradual engagement of the clutch.

10. In an automobile, in combination, an engine, a clutch, a clutch operating lever, an electrical supply and a clutch-control system comprising a drum rotated in a fixed direction at greatly reduced speed relative to the engine speed, a foot-operated electric switch located in a comfortable position for the driver, an electromagnetic solenoid, a plunger within said electromagnetic solenoid, retarding means for said plunger, and a flexible frictional belt coiled around said drum, having one end connected to the clutch operating lever and the other end to the plunger, whereby the closing of said electric switch energizes the electromagnetic solenoid from the electrical supply, couples the flexible frictional belt with the drum and disengages the clutch, and whereby the opening of said electric switch causes a gradual engagement of the clutch.

11. In a motor vehicle, the combination with a normally spring-engaged clutch, of an engine-power operable member for actuating said clutch, a manually controllable mechanism including a plunger for applying engine-power to said member and for releasing power therefrom, and air-flow restricting means for opposing the motion of said plunger, for applying engine-power to said member to regulate rate of clutch engagement.

12. In a motor vehicle, in combination, a normally engaged clutch, an engine-power operable member for disengaging said clutch, a manually controllable mechanism including a movable element for applying engine-power to said member to disengage the clutch and for releasing power therefrom, said engine-power being derived from the driving side of said clutch independent of engagement of said clutch, and means for retarding motion of said element, for thereby causing engine-power to be applied to said member to regulate rate of clutch engagement.

13. In a motor vehicle, in combination, a normally engaged clutch, an engine-power operable member for disengaging said clutch, a mechanism for applying engine-power to said member to disengage said clutch and for releasing power therefrom, said engine-power being derived from the driving side of said clutch independent of engagement of said clutch, and means modifying a motion of a movable element of said mechanism, for thereby causing engine-power to be applied to said member to regulate the engaging movement of said clutch.

14. In a motor vehicle, in combination, a normally engaged clutch, an engine-power operable member for disengaging said clutch, mechanism for controlling application of engine-power by said member to said clutch said engine-power being obtained from the driving side of said clutch independent of engagement of the clutch, and means opposing any amount of motion in said mechanism of a movable element of said mechanism, for thereby determining application of engine-power to said member to regulate the clutch-closing movement of said clutch.

15. In a motor vehicle, an engine, a normally engaged clutch, a member for disengaging said clutch by power from said engine, said power being obtained from the driving side of said clutch independent of engagement of the clutch, and control mechanism for controlling the displacement of said member, including a retardation establishing means operative upon a movement of a movable element of said mechanism to retard said element, and by said retardation causing engine-power to be applied to said member to regulate rate of clutch engagement.

16. In a motor vehicle, the combination with an engine for propelling the vehicle and a normally engaged clutch for transmitting power to the vehicle from said engine, of mechanism operable by power from said engine independent of the clutch engagement, for disengaging said clutch, including means determining application of engine-power to said mechanism to regulate clutch-closing movement, by regulating the amount of retardation of movement of a movable element of said mechanism.

17. The combination with a motor-vehicle having a clutch and means for closing said clutch, of a mechanism for controlling said closing; said mechanism including a means operable by engine-power independently of the clutch, for regulating the closing movement of the clutch, whereby engine-power is applicable for resisting the action of said closing means in whole or in part, and for modifying the motion which said closing means tends to impart to said clutch, and a control means effective for controlling the amount of engine-power applied to said engine-power operable means, said control means including a movable element, and having the capability of causing a modification of a movement of said element, and by the amount of said modification determining an amount of engine-power applied to said engine-power operable means.

EDWARD H. LANGE.